ian States Patent (12) United States Patent
Ikeda et al.

(10) Patent No.: US 11,829,868 B2
(45) Date of Patent: Nov. 28, 2023

(54) FEATURE VALUE GENERATION DEVICE, FEATURE VALUE GENERATION METHOD, AND PROGRAM (71) Applicant: NIPPON TELEGRAPH AND TELEPHONE CORPORATION, Chiyoda-ku (JP)

(72) Inventors: Yasuhiro Ikeda, Musashino (JP); Yusuke Nakano, Musashino (JP); Keishiro Watanabe, Musashino (JP); Keisuke Ishibashi, Musashino (JP); Ryoichi Kawahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 930 days.

(21) Appl. No.: 16/480,024

(22) PCT Filed: Oct. 31, 2017

(86) PCT No.: PCT/JP2017/039336
§ 371 (c)(1),
(2) Date: Jul. 23, 2019

(87) PCT Pub. No.: WO2018/142694
PCT Pub. Date: Aug. 9, 2018

(65) Prior Publication Data
US 2019/0392317 A1 Dec. 26, 2019

(30) Foreign Application Priority Data
Feb. 2, 2017 (JP) ................ 2017-017921

(51) Int. Cl.
*G06N 3/08* (2023.01)
*G06F 17/16* (2006.01)
*G06N 5/022* (2023.01)
*G06F 18/214* (2023.01)

(52) U.S. Cl.
CPC .............. *G06N 3/08* (2013.01); *G06F 17/16* (2013.01); *G06F 18/2155* (2023.01); *G06N 5/022* (2013.01)

(58) Field of Classification Search
CPC .................................. G06N 3/08; G06F 17/16
See application file for complete search history.

(56) References Cited

U.S. PATENT DOCUMENTS 6,950,753 B1 * 9/2005 Rzhetsky ............... G16H 70/60
702/19
2006/0224579 A1 10/2006 Zheng
(Continued)

FOREIGN PATENT DOCUMENTS

JP      2004-78618 A    3/2004
JP      2006-285982 A   10/2006
WO      WO 2015/072085 A1  5/2015

OTHER PUBLICATIONS

International Search Report dated Dec. 26, 2017 in PCT/JP2017/039336 filed on Oct. 31, 2017.
(Continued)

*Primary Examiner* — Bryan S Blankenagel
(74) *Attorney, Agent, or Firm* — Oblon, McClelland, Maier & Neustadt, L.L.P.

(57) ABSTRACT

A feature value generation device includes a generator configured to digitize non-numerical text data items collected at a plurality of timings from a target of anomaly detection, to generate vectors whose elements are feature values corresponding to the digitized data items; a learning unit configured to learn the vectors during a learning period so as to output a learning result; and a detector configured to detect, during a test period, for each of the vectors generated by the generator, an anomaly based on said each of the vectors and the learning result.

3 Claims, 6 Drawing Sheets (56) References Cited

U.S. PATENT DOCUMENTS

| | | | | |
|---|---|---|---|---|
| 2009/0132506 A1* | 5/2009 | Houck | ............. | G06F 16/90332 |
| 2011/0066379 A1* | 3/2011 | Mes | ............. | G01V 3/165 |
| | | | | 702/6 |
| 2014/0180980 A1* | 6/2014 | Hido | ............. | G06Q 10/10 |
| | | | | 706/12 |
| 2017/0220668 A1* | 8/2017 | Patton | ............. | G06F 16/951 |
| 2019/0297520 A1* | 9/2019 | Vedam | ............. | H04L 43/0876 |
| 2019/0391038 A1* | 12/2019 | Kitai | ............. | G06N 20/10 |
| 2020/0258004 A1* | 8/2020 | Heimann | ............. | G06N 20/00 |

OTHER PUBLICATIONS

Sakurada, M. et al., "Dimensionality Reduction with the Autoencoder for Anomaly Detection of Spacecrafts", The 28$^{th}$ Annual Conference of the Japanese Society for Artificial Intelligence, 2014, pp. 1-3.

Banerjee, A. et al., "A Support Vector Method for Anomaly Detection in Hyperspectral Imagery", IEEE Transactions on Geoscience and Remote Sensing, vol. 44, No. 8, 2006, pp. 2282-2291.

Kimura, T. et al., "Proactive Failure Detection Learning Generation Patterns of Large-scale Network Logs", Network and Service Management (CNSM), 11th International Conference on. IEEE, 2015, pp. 8-14.

Mikolov, T. et al., "Efficient Estimation of Word Representations in Vector Space", arXiv preprint arXiv:1301.3781, 2013, pp. 1-12.

Mitchell, J. et al., "Composition in Distributional Models of Semantics", Cognitive Science, vol. 34, 2010, pp. 1388-1429.

* cited by examiner

FEATURE VALUE GENERATION DEVICE, FEATURE VALUE GENERATION METHOD, AND PROGRAM

TECHNICAL FIELD

The present invention relates to a feature value generation device, a feature value generation method, and a program.

BACKGROUND ART

As a real-time method of anomaly detection of a computer system, one may consider an algorithm that periodically observes various data items on the system so as to detect the data as "anomalous" if the data exhibits a tendency different from normal ones.

For example, an anomaly detection algorithm may be considered in which data in a "learning period" defined in advance as a normal time is used as training data to be learned, and during a "test period" to execute anomaly detection, a tendency in observed test data is compared with a tendency in the learned training data.

Although various techniques have been proposed as anomaly detection algorithms, in many cases, it is desirable that data to be input be represented in normalized vectors (see, e.g., Non-patent document 1 and Non-patent document 2).

RELATED ART DOCUMENTS

Non-Patent Documents

Non-Patent Document 1: Mayu Sakurada, Takehisa Yairi, "Dimensionality Reduction with the Autoencoder for Anomaly Detection of Spacecrafts", 28th Annual Conference of the Japanese Society for Artificial Intelligence, 1-3, 2014

Non-Patent Document 2: Amit Banerjee, Philippe Burlina, and Chris Diehl, "A Support Vector Method for Anomaly Detection in Hyperspectral Imagery", IEEE Transactions on Geoscience and Remote Sensing vol. 44, no. 8, p. 2282, 2006

Non-Patent Document 3: Kimura, Tatsuaki, et al., "Proactive failure detection learning generation patterns of large-scale network logs", Network and Service Management (CNSM), 2015 11th International Conference on. IEEE, 2015

Non-Patent Document 4: Mikolov, Tomas, et al., "Efficient estimation of word representations in vector space", arXiv preprint arXiv:1301.3781, 2013 Non-patent Document 5: Mitchell, Jeff, and Mirella Lapata, "Composition in distributional models of semantics", Cognitive science 34.8 (2010): 1388-1429.

SUMMARY OF INVENTION

Problem to be Solved by the Invention

In the case of detecting anomaly based on observed data in a network, the observed data may include non-numerical text data such as log messages (e.g., syslog messages) on hosts. However, such non-numerical text data is not suitable for detecting anomaly, and ideas are required to convert such data into vectors for detecting anomaly.

The present invention has been made in view of the above, and has an object to generate a feature value for detecting an anomaly from non-numerical text data when the non-numerical text data is included in data collected from a target of anomaly detection.

Means for Solving the Problem

Thereupon, in order to solve the above problems, a feature value generation device includes a generator configured to digitize non-numerical text data items collected at a plurality of timings from a target of anomaly detection, to generate vectors whose elements are feature values corresponding to the digitized data items; a learning unit configured to learn the vectors during a learning period so as to output a learning result; and a detector configured to detect, during a test period, for each of the vectors generated by the generator, an anomaly based on said each of the vectors and the learning result.

Advantage of the Invention

It is possible to generate a feature value for detecting an anomaly from non-numerical text data when the non-numerical text data is included in data collected from a target of anomaly detection.

EMBODIMENTS OF THE INVENTION

Figure 1:
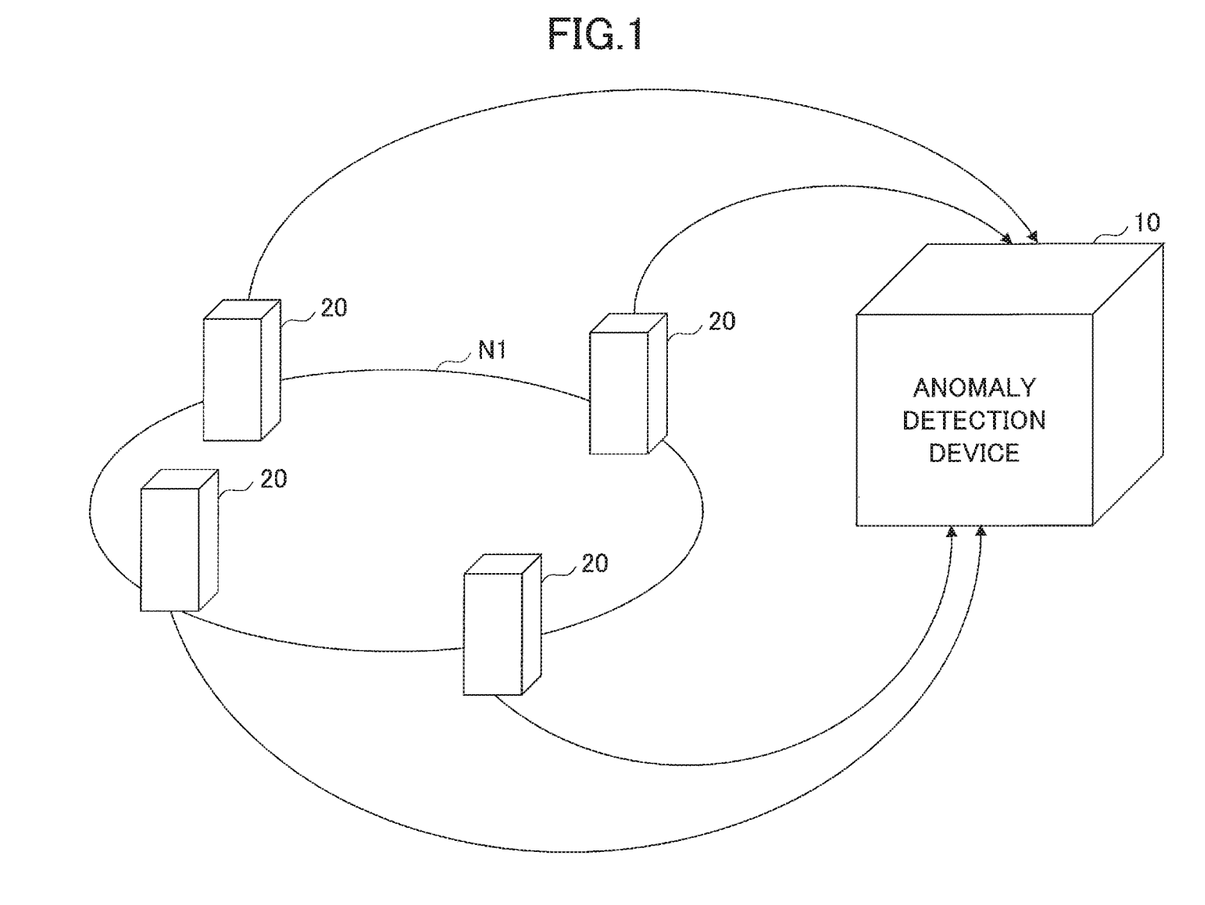
FIG. 1 is a diagram illustrating an example of a system configuration according to a first embodiment.

In the following, embodiments of the present invention will be described with reference to the drawings. FIG. 1 is a diagram illustrating an example of a system configuration according to a first embodiment. In FIG. 1, a network N1 is a network in which anomaly is to be detected. The network N1 is constituted with multiple nodes, such as routers and server devices being connected with each other, in which packets are transmitted and received between any nodes to provide predetermined services.

Measuring devices 20 are arranged at multiple locations in the network N1. The measuring device 20 samples observed data obtained by monitoring the arranged location at multiple timings. Examples of observed data to be collected include non-numerical text data such as syslog messages and the like.

Syslog is a standard for transferring log messages over a network, with which the measurement device 20 is compliant. A log message transferred by syslog includes "time, message, host", and the like. The time is a time at which the message was output and is referred to as a "time stamp" in the following description. The message is a content of the message output by the measuring device 20 and is a non-numerical text data item. The host is an identifier for identifying the measuring device 20 that has output the message.

Observed data items sampled by the measuring device 20 are collected by the anomaly detection device 10. The anomaly detection device 10 is a computer that learns features in a normal time from the collected observed data, and based on the learning result, detects an occurrence of an anomaly (determines the presence or absence of an anomaly) with respect to observed data input after the learning. Note that a process of learning features in a normal time is referred to as the "learning process", and a period during which the learning process is executed is referred to as the "learning period". A process of detecting anomaly based on a learning result obtained in the learning process is referred to as the "test process", and a period during which the test process is performed is referred to as the "test period".

Figure 2:
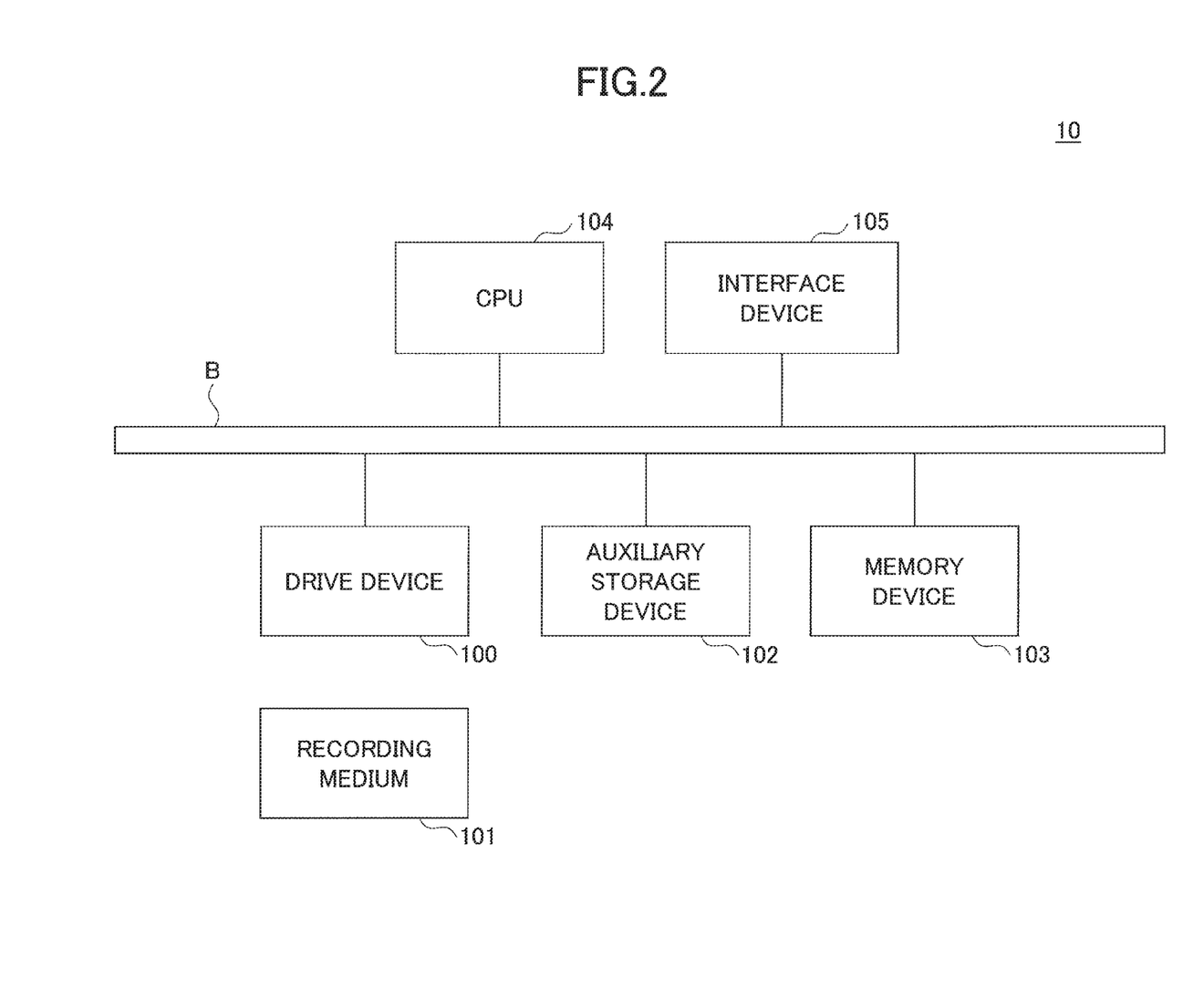
FIG. 2 is a diagram illustrating an example of a hardware configuration of an anomaly detection device 10 according to the first embodiment.

FIG. 2 is a diagram illustrating an example of a hardware configuration of the anomaly detection device 10 according to the first embodiment. The anomaly detection device 10 in FIG. 2 includes a drive device 100, an auxiliary storage device 102, a memory device 103, a CPU 104, and an interface device 105, which are connected with each other via a bus B.

A program that implements processing on the anomaly detection device 10 is provided by a recording medium 101 such as a CD-ROM. When the recording medium 101 storing the program is set into the drive device 100, the program is installed in the auxiliary storage device 102 from the recording medium 101 through the drive device 100. However, installation of the program does not necessarily need to be done from the recording medium 101; the program may be downloaded from another computer via a network. The auxiliary storage device 102 stores the installed program and stores necessary files, data, and the like.

The memory device 103 reads out the program from the auxiliary storage device 102 and stores the program when an activation command of the program is received. The CPU 104 executes functions relating to the anomaly detection device 10 according to the program stored in the memory device 103. The interface device 105 is used as an interface for connecting to a network.

Figure 3:
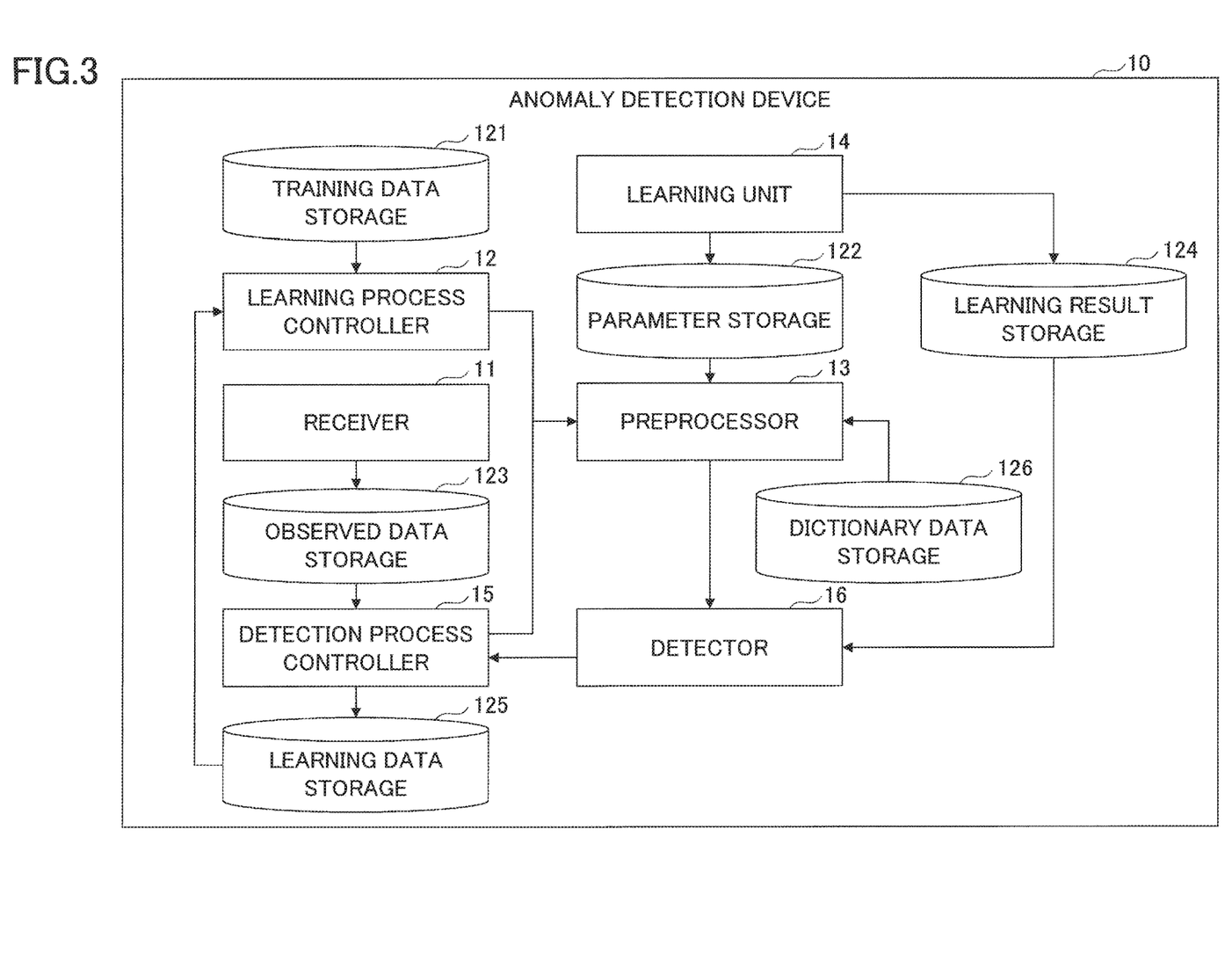
FIG. 3 is a diagram illustrating an example of a functional configuration of the anomaly detection device 10 according to the first embodiment.

FIG. 3 is a diagram illustrating an example of a functional configuration of the anomaly detection device 10 according to the first embodiment. In FIG. 3, the anomaly detection device 10 includes a receiver 11, a learning process controller 12, a preprocessor 13, a learning unit 14, a detection process controller 15, and a detector 16. Each of these units is implemented by a process that one or more programs installed in the anomaly detection device 10 cause the CPU 104 to execute. The anomaly detection device 10 also uses a training data storage 121, a parameter storage 122, an observed data storage 123, a learning result storage 124, a learning data storage 125, and a dictionary data storage 126. Each of these storage units can be implemented, for example, by using the auxiliary storage device 102 or a storage device that can be connected to the anomaly detection device 10 via a network.

In the training data storage 121, observed data that has been confirmed to have been collected in a normal time is stored as training data. However, training data may be artificially generated instead of selected from among observed data.

The receiver 11 receives observed data from the measuring devices 20. The received observed data is stored in the observed data storage 123.

The learning process controller 12 controls a learning process.

The preprocessor 13 executes a preprocess for a set of training data, a set of observed data, or a set of learning data stored in the learning data storage 125. The preprocess is a process of extracting feature values for unit-time intervals from a data set, a process of normalizing the extracted feature values, and the like. Feature values are represented in the form of vectors. A non-numerical text data item is vectorized by using an ID and the like, so as to extract feature values. For vectorization, a dictionary for digitizing the text data stored in the dictionary data storage 126 in advance may be used. Note that in a learning period, a group of training data stored in the training data storage 121 is preprocessed. In a test period, once the receiver 11 has started receiving observed data, the group of observed data is preprocessed. Further, once the detector 16 has started detecting anomaly, and the observed data that is determined to be normal and stored in the learning data storage 125 as the learning data reaches a predetermined number of data items, the group of learning data may be preprocessed.

When preprocessing a group of training data or a group of learning data, the preprocessor 13 also generates or updates parameters for normalizing the observed data or the learning data (referred to as the "normalization parameters", below), and stores the generated or updated normalization parameters in the parameter storage 122. The preprocessor 13 stores IDs assigned to messages in the parameter storage 122.

The learning unit 14 executes learning based on training data or learning data. The learning result obtained by the learning unit 14 is stored in the learning result storage 124.

The detection process controller 15 controls a detection process.

The detector 16 detects an occurrence of an anomaly based on a vector generated when the preprocessor 13 applies a preprocess to the observed data stored in the observed data storage 123, and on a learning result stored in the learning result storage 124. Specifically, the detector 16 calculates for the preprocessed vector a difference from the learning result as the degree of anomaly, and compares the degree of anomaly to a threshold value to detect an occurrence of an anomaly. A value before normalization of the vector with which no anomaly is detected may be stored in the learning data storage 125 as learning data.

Figure 4:
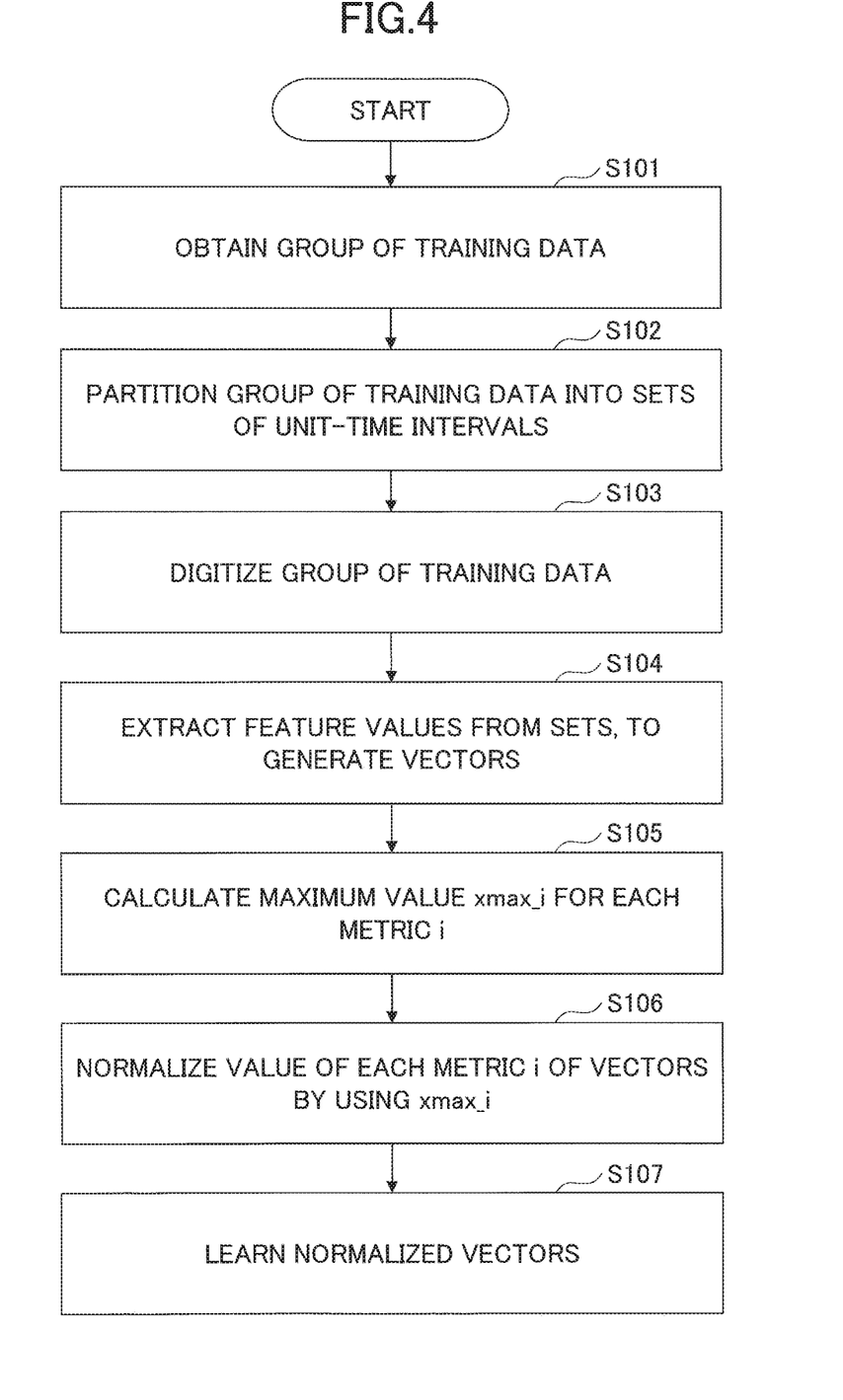
FIG. 4 is a flowchart for describing an example of processing steps of a learning process according to the first embodiment.

In the following, processing steps executed by the anomaly detection device 10 will be described. FIG. 4 is a flowchart for describing an example of processing steps of a learning process according to the first embodiment.

Once the learning process has been started, the learning process controller 12 obtains a group of training data from the training data storage 121 and inputs the group of training data into the preprocessor 13 (S101).

Next, the preprocessor 13 partitions the input group of training data into sets corresponding to unit-time intervals (S102). Here, assume that the training data storage 121 stores training data corresponding to a period of the unit time multiplied by U intervals (learning period). Therefore, the group of training data is partitioned into U sets.

Next, the preprocessor 13 extracts feature values in accordance with the purpose for each of the partitioned sets, to generate a multidimensional vector in which the extracted feature values are elements of the respective dimensions.

For example, assume that the unit time is one minute, and the preprocessor 13 extracts a feature value for every one-minute interval. Assume that the training data consists of syslog messages, the training data is represented as a set of text data items each of which has a time stamp attached, namely, ltrain_d={wtrain_{d, w}} (d=1, . . . , D, w=1, . . . , W_d, where D represents the number of training data items and W_d represents the d-th text), and the data takes a format, for example, that includes attributes of "time stamp" and "text" as follows.

| Time stamp | Text |
|---|---|
| 12:00:00 | I have a pen |
| 12:00:03 | I have an apple |
| ... | |

The preprocessor 13 assigns IDs to the texts ltrain_1, ltrain_2, . . . , ltrain_D of the training data in some way to associate the IDs with the respective texts so as to digitize the text data (S103). The training data having the IDs assigned takes a format that includes attributes of "time stamp" and "ID" as follows.

| Time stamp | ID |
|---|---|
| 12:00:00 | 0 |
| 12:00:03 | 1 |
| ... | | where 0 is the ID assigned to "I have a pen" and 1 is the ID assigned to "I have an apple". As the method of assigning IDs to texts, it is possible to consider a technique that enables, given a set of texts, without requiring prior knowledge of the texts, to assign the same ID to the text of the same content (see, e.g., Non-Patent Document 3).

Assuming that the flow start time of the first training data is 12:00:00, for a set of training data items whose flow start time t falls within $11:59:00 \leq t < 12:00:00$ among all the training data items, the preprocessor 13 calculates the number of occurrences of each ID i multiplied by train_{τtrain, i} (τtrain represents a unit time during which the number of occurrences is to be calculated). The preprocessor 13 generates time series data of vectors where each vector has the dimensionality of the total number of IDs M, and has feature values as the elements each of which corresponds to the number of occurrences of each ID (S104). For example, if the time stamps of training data are assigned until 12:59:59 and the total number of assigned IDs is three, assuming that each element simply corresponds to the number of occurrences, the time series data takes the following format.

| Time | ID_0 | ID_1 | ID_2 |
|---|---|---|---|
| 12:00 | 2 | 1 | 0 |
| 12:01 | 1 | 2 | 3 |
| 12:02 | 0 | 3 | 3 |
| ... | | | |
| 12:59 | 3 | 0 | 1 |

Note that all the assigned IDs (here, {0, 1, 2}) are stored in the parameter storage 122.

Next, the preprocessor 13 calculates a maximum value xmax_i of each metric i (the number of occurrences of each ID i) among vectors, to store the calculated xmax_i in the parameter storage 122 (S105). In other words, in the first embodiment, the maximum value xmax_i of each metric i is a normalization parameter.

In the case of the time series data described above, the maximum values xmax_i of the metrics of these vectors are {3, 3, 3} (i.e., xmax_1=3, xmax_2=3, and xmax_2=3).

Next, the preprocessor 13 normalizes each vector based on the normalization parameters (S106). Normalization is executed by dividing the metric i of each vector by the maximum value xmax_i. Therefore, the time series data of the normalized vectors takes the following format.

| Time | ID_0 | ID_1 | ID_2 |
|---|---|---|---|
| 12:00 | 0.66 | 0.33 | 0 |
| 12:01 | 0.33 | 0.66 | 1 |
| 12:02 | 0 | 1 | 1 |
| ... | | | |
| 12:59 | 1 | 0 | 0.33 |

Next, the learning unit 14 executes learning on the vectors by using a learning machine (S107). The learning result is stored in the learning result storage 124.

Figure 5:
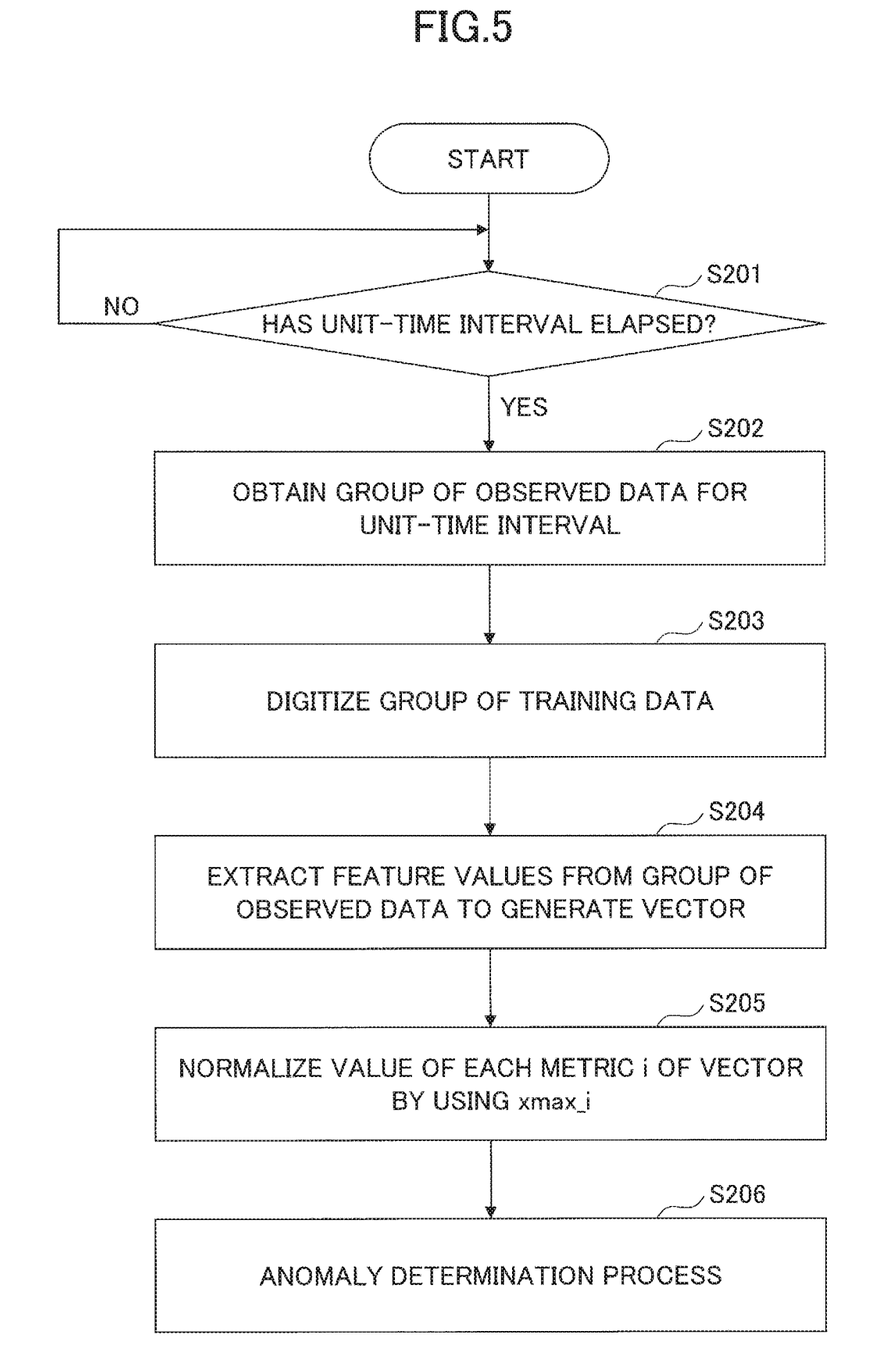
FIG. 5 is a flowchart for describing an example of processing steps of a detection process according to the first embodiment.

FIG. 5 is a flowchart for describing an example of processing steps of a detection process according to the first embodiment. The processing steps in FIG. 5 may be started at any time after Step S107 in FIG. 4 has been executed at least once. In other words, the processing steps in FIG. 5 are executed in parallel with the processing steps in FIG. 4.

At Step S201, the detection process controller 15 waits for a unit-time interval to elapse. The unit-time interval has the same time length as the unit-time interval described with FIG. 4. Observed data collected in real time and received by the receiver 11 during this waiting is stored in the observed data storage 123.

Once the unit-time interval has elapsed (YES at S201), the detection process controller 15 obtains the group of observed data of the latest unit-time interval from the observed data storage 123, to input the group of observed data into the preprocessor 13 (S202).

Next, the preprocessor 13 extracts feature values in accordance with the purpose from the group of observed data, to generate multidimensional vectors in which the extracted feature values are elements of the respective dimensions. For example, the preprocessor 13 digitizes texts of observed data ltest_t={wtest_{t, w}} (t=1, . . . , T, w=1, . . . , W_t, where T represents the entire time period of anomaly detection and W_t represents a text at time t) by assigning IDs in the same way as at Step S103 (S203) Also, the preprocessor 13 calculates the number of occurrences of each ID in the same way as at Step S104. At this time, the preprocessor 13 refers to all IDs assigned to the training data stored in the parameter storage 122, and if an ID not assigned to the training data occurs in an observed data item, the number of occurrences is not counted, and the observed data item is ignored. Therefore, in the example using three IDs ID_0, ID_1, and ID_3, three-dimensional vectors are generated.

Next, the preprocessor 13 normalizes the generated vector based on the maximum value xmax_i stored in the parameter storage 122 (S205). In other words, each metric i of the vector is divided by the maximum value xmax_i.

Next, the detector 16 executes an anomaly determination process (S206). In the anomaly determination process, the presence or absence of an anomaly is determined for the network N1 based on the normalized vector and the latest learning result stored in the learning result storage 124.

If it is determined that there is no anomaly, the detection process controller 15 may store the vector before normalization in the learning data storage 125 as learning data. If it is determined that there is an anomaly, the vector before normalization is not stored in the learning data storage 125. Accordingly, only vectors determined as normal are stored in the learning data storage 125.

At Step S107 in FIG. 4, the learning unit 14 generates a learning machine by using the training data. As a learning machine, an autoencoder (Non-Patent Document 1) that detects anomaly by learning a correlation between the metrics of a vector, principal component analysis, or the like may be used. As for principal component analysis, details can be found in, for example, Ringberg, Haakon, et al., "Sensitivity of PCA for traffic anomaly detection", ACM SIGMETRICS Performance Evaluation Review 35.1, pp. 109-120, 2007. In the present embodiment, an example in which an autoencoder is used as a learning machine will be described.

Figure 6:
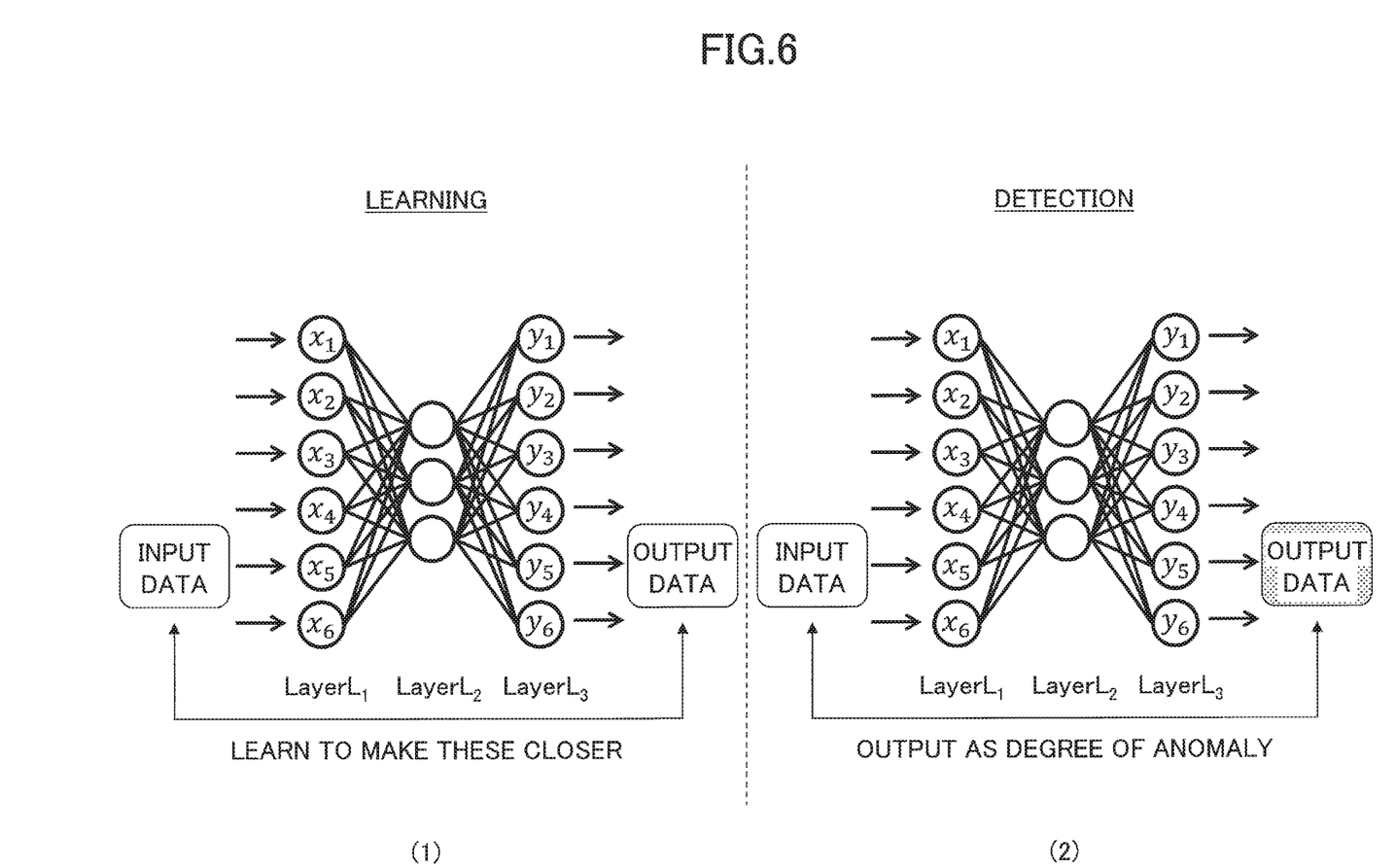
FIG. 6 is a diagram illustrating an autoencoder.

FIG. 6 is a diagram for describing an autoencoder. The autoencoder is an algorithm of anomaly detection based on deep learning. The autoencoder utilizes a fact that normal input data has a correlation between metrics, and hence, can be compressed to lower dimensions. When an anomaly occurs, since the correlation between the input data does not hold, compression is not executed correctly, and the difference between the input data and the output data becomes great.

As illustrated in (1) in FIG. 6, a learning machine (autoencoder) generated by the learning unit 14 executes learning so that the output layer (Layer L3) becomes closer to the input layer (Layer L1). Specifically, the learning unit 14 duplicates a vector into two, applies one of the vectors to the input layer, and applies the other to the output layer, to execute learning so as to output a learning result. The learning result is stored in the learning result storage 124. The learning result is a group of parameters for the learning machine. Note that since the learning machine is generated for each data type, the learning result is also output for each data type to be stored in the learning result storage 124.

Meanwhile, the detector 16, like the learning unit 14, generates a learning machine. The learning machine may use a method corresponding to the learning machine generated by the learning unit 14, among the autoencoder, principal component analysis, and the like, as in the case of generating a learning machine generated by the learning unit 14.

At Step S206 in FIG. 5, the detector 16 generates a learning machine based on learning results stored in the learning result storage 124. In other words, a learning machine generated by the detector 16 is the same as the learning machine generated by the learning unit 14 when outputting the learning result. The detector 16 calculates the distance between the input data and the output data (an index indicating the degree of collapse of the correlation between the metrics) for the learning machine as the degree of anomaly. In the present embodiment, the mean squared error (MSE) as the distance between the input layer and the output layer of the autoencoder is calculated as the degree of anomaly. The formula of MSE is as follows.

$$MSE = \frac{1}{n}\sum_{i=1}^{n}(\hat{x}_i - x_i)^2 \qquad \text{Formula 1}$$

In the present embodiment, MSE is obtained for the numbers of occurrences of messages. The detector 16 calculates a mean of the obtained MSE as the final degree of anomaly, to determine that an anomaly occurs if the final degree of anomaly exceeds a predetermined threshold value. Otherwise, the detector 16 determines it as normal.

As described above, according to the first embodiment, feature quantities are generated from non-numerical text data for detecting anomaly. Accordingly, anomaly can be detected even when non-numerical text data is included in training data and observed data.

Next, a second embodiment will be described. In the second embodiment, points that differ from the first embodiment will be described. The points not specifically mentioned in the second embodiment may be the same as in the first embodiment.

In the second embodiment, at Step S104 in FIG. 4, instead of setting the total number of IDs M as the dimensionality, a number M+K obtained by adding a predetermined number of IDs K to the total number of IDs M is set as the dimensionality. In training data, the (M+1)-th to (M+K)-th elements are all set to 0. For example, in the case of K=1, in the example of the time series data in the first embodiment, a dimension of "ID_*" is added as follows, and the element is set to 0 in all data items.

| Time  | ID_0 | ID_1 | ID_2 | ID_* |
|-------|------|------|------|------|
| 12:00 | 2    | 1    | 0    | 0    |
| 12:01 | 1    | 2    | 3    | 0    |
| 12:02 | 0    | 3    | 3    | 0    |
| ...   |      |      |      |      |
| 12:59 | 3    | 0    | 1    | 0    |

Also, at Step S204 in FIG. 5, if an ID not assigned to the training data occurs in the observed data, it is represented by the element of "ID_*" As the method of representation, it is possible to consider a method in which the element represents the number of occurrences of IDs not assigned to the training data; or a method in which the element is set to 1 if an ID not assigned to the training data occurs, or set to 0 otherwise. The latter example may be represented such that the element is set to 1 if the number of occurrences of IDs not assigned to the training data is greater than or equal to 1, or set to 0 otherwise. Also, in the case of K>1, when multiple unknown IDs occur, a method may be considered that classifies these into K types to be represented in the (M+1)-th to (M+K)-th dimensions, respectively. For example, assuming that the n-th occurrence of an unknown ID is to be represented in the (M+mod(n, K))-th dimension, it is possible to perform classification such that the first occurrence of an unknown ID is represented in the (M+1)-th dimension; the second occurrence of an unknown ID is represented in the (M+2)-th dimension; . . . ; the K-th occurrence of an unknown ID is represented in the (M+K)-th dimension; and the (K+1)-th occurrence of an unknown ID is represented in the (M+1)-th dimension.

According to the second embodiment, substantially the same effect can be obtained as in the first embodiment. Also, even if IDs that do not occur in the training data occur in the observed data, these can be represented in the (M+1)-th to (M+K)-th dimensions, and it is possible to detect anomaly in logs in which unknown words occur.

Next, a third embodiment will be described. In the third embodiment, points that differ from the first embodiment will be described. The points not specifically mentioned in the third embodiment may be the same as in the first embodiment.

In the third embodiment, at Step S103 in FIG. 4, instead of assigning IDs to texts, IDs are assigned to words in texts. Here, a dictionary representing a relationship between words and IDs is used; the dictionary may be stored in the dictionary data storage 126 in advance or a method may be considered to generate the dictionary based on training data. In the case of generating a dictionary based on training data, assuming that IDs are assigned in the order of occurrence in texts, in the example of the training data in the first embodiment, a dictionary is generated to include {0:I, 1:have, 2:a, 3:pen, 4:an, 5:apple, . . . }. The preprocessor 13 generates training data that takes a format with the attributes of "time stamp" and "occurrence IDs" as follows.

| Time stamp | Occurrence IDs |
|---|---|
| 12:00:00 | {0, 1, 2, 3} |
| 12:00:03 | {0, 1, 4, 5} |
| . . . | |

All the IDs (here, {0, 1, 2, 3, 4, 5}) assigned here are stored in the parameter storage 122.

At Step S104 in FIG. 4, the preprocessor 13 generates time series data of vectors where each vector has the dimensionality of the total number of IDs N, and has feature values as elements based on the training data as described above. As the method of vectorization, it is possible to consider setting the total number of assigned IDs N as the dimensionality, and setting to 1 if a corresponding ID occurs, or to 0 otherwise. In other words, when the number of occurrences of an ID is greater than or equal to 1, it is set to 1, or to 0 otherwise.

For example, in the example described above, if the total number of assigned IDs is six, data having "Time stamp" and "vector" as elements is generated as follows.

| Time stamp | Vector |
|---|---|
| 12:00:00 | {1, 1, 1, 1, 0, 0} |
| 12:00:03 | {1, 1, 0, 0, 1, 1} |
| . . . | |

Alternatively, it is possible to consider a method of setting the number of occurrences as the value of each element. For example, if "pen" occurs twice in a text, the word in the vector is set to 2. The preprocessor 13 generates time series data of the vectors for unit-time intervals based on the data described above. As the method of reorganizing vectors for time stamps into vectors for unit-time intervals, for example, it is possible to consider a method of taking the center of gravity. In the above example, if texts occurring between 12:00:00 and 12:00:59 are only the above two items, taking the center of gravity generates the following time series data.

| Time | Vector |
|---|---|
| 12:00 | {1, 1, 0.5, 0.5, 0.5, 0.5} |

Similarly, at Step S203 in FIG. 5, words in texts of the observed data are assigned IDs. At Step S204 in FIG. 5, with reference to all IDs assigned to the training data stored in the parameter storage 122, if an ID not assigned to the training data occurs as a word in the observed data, the number of occurrences is not counted, and the word is ignored. Therefore, in the example using six IDs of ID_0 to ID_5, a six-dimensional vector is generated.

According to the third embodiment, substantially the same effect can be obtained as in the first embodiment.

Next, a fourth embodiment will be described. In the fourth embodiment, points that differ from the third embodiment will be described. The points not specifically mentioned in the fourth embodiment may be the same as in the third embodiment.

In the fourth embodiment, at Step S104 in FIG. 4, instead of setting the total number of IDs N as the dimensionality, a number N+K obtained by adding a predetermined number of IDs K to the total number of IDs N is set as the dimensionality. In training data, the (N+1)-th to (N+K)-th elements are all set to 0. For example, in the case where K=1, in the example of the time series data in the third embodiment, the (N+1)-th element is set to 0 as follows.

| Time | Vector |
|---|---|
| 12:00 | {1, 1, 0.5, 0.5, 0.5, 0.5, 0} |

Also, at Step S204 in FIG. 5, if IDs not assigned to the training data occur as words of the observed data, these are represented as the (N+1)-th to (N+K)-th elements. As the method of representation, it is possible to consider a method in which the element represents the number of occurrences of IDs not assigned to the training data; or a method in which the element is set to 1 if an ID not assigned to the training data occurs, or set to 0 otherwise. The latter example may be represented such that the element is set to 1 if the number of occurrences of IDs not assigned to the training data is greater than or equal to 1, or set to 0 otherwise. Also, in the case of K>1, when multiple unknown IDs occur, a method may be considered that classifies these into K types to be represented in the (M+1)-th to (M+K)-th dimensions, respectively. For example, assuming that the n-th occurrence of an unknown ID is to be represented in the (M+mod(n, K))-th dimension, it is possible to perform classification such that the first occurrence of an unknown ID is represented in the (M+1)-th dimension; the second occurrence of an unknown ID is represented in the (M+2)-th dimension; . . . ; the K-th occurrence of an unknown ID is represented in the (M+K)-th dimension; and the (K+1)-th occurrence of an unknown ID is represented in the (M+1)-th dimension.

According to the fourth embodiment, substantially the same effect can be obtained as in the third embodiment. Also, even if IDs that do not occur in the training data occur in the observed data, these can be represented in the (N+1)-th to (N+K)-th dimensions, and it is possible to detect anomaly in logs in which unknown words occur.

Next, a fifth embodiment will be described. In the fifth embodiment, points that differ from the third embodiment will be described. The points not specifically mentioned in the fifth embodiment may be the same as in the third embodiment.

In the fifth embodiment, at Step S103 in FIG. 4, instead of assigning IDs to words in texts, the texts are vectorized based on vector representations of the words. As the method of assigning vectors to the words, a method using word2vec may be considered (see Non-Patent Document 4). For example, a dictionary is used in which N-dimensional vectors are assigned to respective words such as {cat{0.3, 0.2, 0.5}, dog{0.1, 0.4, 0.2}, . . . }; here, the dictionary may be stored in the dictionary data storage 126 in advance or a method may be considered to generate the dictionary based on training data. The preprocessor 13 vectorizes each text based on vector representations of multiple words prepared in advance. As a result, data items are generated, each of which has "time stamp" and "vector" as the elements.

At Step S104 in FIG. 4, the preprocessor 13 synthesizes vectors corresponding to respective words to generate time series data of the vectors. Various methods can be considered as the method of synthesizing vectors corresponding to respective words, such as a method of simply taking a sum of vectors; a method of taking a weighted sum; a method of taking a product of elements; and the like (see Non-Patent Document 5).

Similarly, at Step S203 in FIG. 5, each text in the observed data is vectorized. At Step S204 in FIG. 5, if a word that does not exist in the dictionary occurs in an observed data item, the word is ignored.

According to the fifth embodiment, substantially the same effect can be obtained as in the third embodiment.

Note that the embodiments described above may be applied to data collected from a source other than a network. For example, each of the above embodiments may be applied to data collected from a computer system.

Note that in each of the embodiments described above, the anomaly detection device 10 is an example of a feature value generation device. The preprocessor 13 is an example of a generator.

As above, the embodiments of the present invention have been described in detail. Note that the present invention is not limited to such specific embodiments, and various modifications and changes may be made within the scope of the subject matters of the present invention described in the claims.

This international application claims priority based on Japanese Patent Application No. 2017-017921 filed on Feb. 2, 2017, and the entire contents of No. 2017-017921 are incorporated herein by reference.

LIST OF REFERENCE SYMBOLS 10 anomaly detection device
11 receiver
12 learning process controller
13 preprocessor
14 learning unit
15 detection process controller
16 detector
20 measuring device
100 drive device
101 recording medium
102 auxiliary storage device
103 memory device
104 CPU
105 interface device
121 training data storage
122 parameter storage
123 observed data storage
124 learning result storage
125 learning data storage
B Bus
N1 network

The invention claimed is:

1. A feature value generation device comprising:
processing circuitry configured to
  detect an anomaly in a target of anomaly detection, the target being a system including a plurality of measuring devices,
  digitize non-numerical text data items collected at a plurality of timings, each being a first predetermined time interval, from the plurality of measuring devices, to generate vectors whose elements are feature values corresponding to the digitized data items; and
  detect, during a test period, for each of the vectors generated, an anomaly based on said each of the vectors and a learning result output during a learning period,
wherein the processing circuitry is configured to generate an autoencoder that outputs the learning result by digitizing non-numerical text data items collected at a plurality of timings from the target of anomaly detection, generating vectors whose elements are feature values corresponding to the digitized data items, and learning the vectors by duplicating a respective vector into two, applying one of the two vectors to the input layer to the autoencoder, and applying the other of the two vectors to the output layer, to execute learning so as to output the learning result,
wherein the processing circuitry assigns IDs to the non-numerical text data items or to words in the non-numerical text data items, to generate the vectors wherein each of the vectors has a dimensionality of a total number of the IDs assigned during the learning period, and has feature values as the elements each of which corresponds to a number of occurrences of each of the IDs over the system for each first predetermined time interval,
wherein the processing circuitry performs normalization all of the vectors collected over a second predetermined time interval that is larger than the first predetermined time interval and includes a total number of the plurality of timings, the normalization being based on dividing each type of feature value, corresponding to each separate assigned ID, by a maximum value of the respective type of feature value collected over the second predetermined time interval, and
wherein when a non-numerical text data item or a word in a non-numerical text data item is an unknown non-numerical text data item or an unknown word in the non-numerical text data item to which an ID is not assigned during the learning period, the non-numerical text data item or the word in the non-numerical text data item is ignored.

2. A feature value generation method executed by a computer, the method comprising:
detecting an anomaly in a target of anomaly detection, the target being a system including a plurality of measuring devices;
digitizing non-numerical text data items collected at a plurality of timings, each being a first predetermined time interval, from the plurality of measuring devices, to generate vectors whose elements are feature values corresponding to the digitized data items;
detecting, during a test period, for each of the vectors generated, an anomaly based on said each of the vectors and a learning result output during a learning period; and
generating an autoencoder that outputs the learning result by digitizing non-numerical text data items collected at a plurality of timings from the target of anomaly detection, generating vectors whose elements are feature values corresponding to the digitized data items, and learning the vectors by duplicating a respective vector into two, applying one of the two vectors to the input layer to the autoencoder, and applying the other of the two vectors to the output layer, to execute learning so as to output the learning result,
wherein the method includes assigning IDs to the non-numerical text data items or to words in the non-numerical text data items, to generate the vectors wherein each of the vectors has a dimensionality of a total number of the IDs assigned during the learning period, and has feature values as the elements each of which corresponds to a number of occurrences of each of the IDs over the system for each first predetermined time interval,
wherein the method further includes normalization all of the vectors collected over a second predetermined time interval that is larger than the first predetermined time interval and includes a total number of the plurality of timings, the normalization being based on dividing each type of feature value, corresponding to each separate assigned ID, by a maximum value of the respective type of feature value collected over the second predetermined time interval, and
wherein when a non-numerical text data item or a word in a non-numerical text data item is an unknown non-numerical text data item or an unknown word in the non-numerical text data item to which an ID is not assigned during the learning period, the non-numerical text data item or the word in the non-numerical text data item is ignored.

3. A non-transitory computer-readable recording medium having a program stored thereon for causing a computer to execute a feature value generation method comprising:
  detecting an anomaly in a target of anomaly detection, the target being a system including a plurality of measuring devices;
  digitizing non-numerical text data items collected at a plurality of timings, each being a first predetermined time interval, from the plurality of measuring devices, to generate vectors whose elements are feature values corresponding to the digitized data items; and
  detecting, during a test period, for each of the vectors generated, an anomaly based on said each of the vectors and a learning result output during a learning period; and
  generating an autoencoder that outputs the learning result by digitizing non-numerical text data items collected at a plurality of timings from the target of anomaly detection, generating vectors whose elements are feature values corresponding to the digitized data items, and learning the vectors by duplicating a respective vector into two, applying one of the two vectors to the input layer to the autoencoder, and applying the other of the two vectors to the output layer, to execute learning so as to output the learning result,
wherein the method includes assigning IDs to the non-numerical text data items or to words in the non-numerical text data items, to generate the vectors wherein each of the vectors has a dimensionality of a total number of the IDs assigned during the learning period, and has feature values as the elements each of which corresponds to a number of occurrences of each of the IDs over the system for each first predetermined time interval,
wherein the method further includes normalization all of the vectors collected over a second predetermined time interval that is larger than the first predetermined time interval and includes a total number of the plurality of timings, the normalization being based on dividing each type of feature value, corresponding to each separate assigned ID, by a maximum value of the respective type of feature value collected over the second predetermined time interval, and
wherein when a non-numerical text data item or a word in a non-numerical text data item is an unknown non-numerical text data item or an unknown word in the non-numerical text data item to which an ID is not assigned during the learning period, the non-numerical text data item or the word in the non-numerical text data item is ignored.

* * * * *